(No Model.)
D. W. BRICKER.
COMBINED CULTIVATOR AND PLOW.
No. 324,219. Patented Aug. 11, 1885.
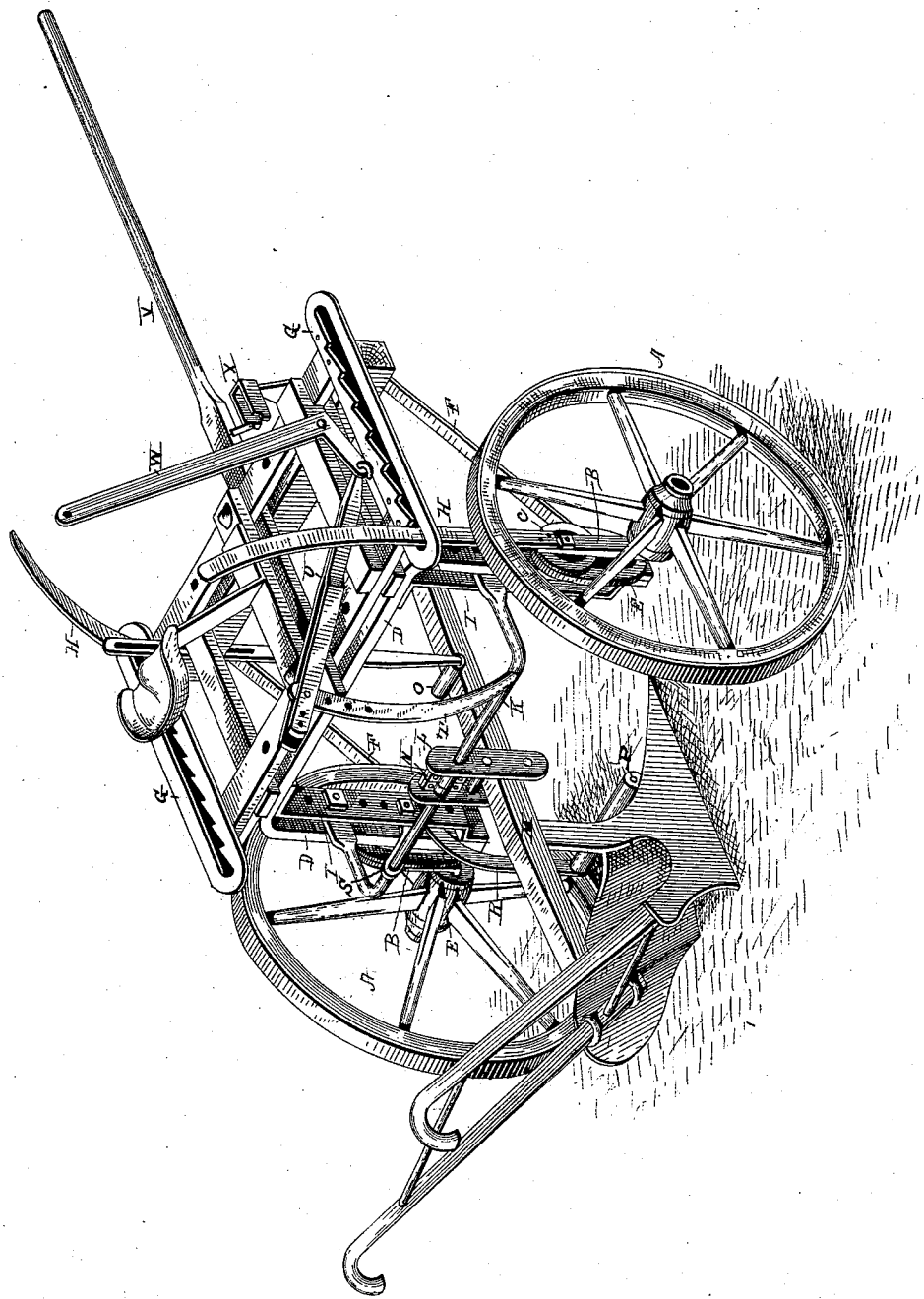
WITNESSES
Edwin L. Yewell
INVENTOR
D. W. Bricker,
By
Attorney

UNITED STATES PATENT OFFICE.

DAVID W. BRICKER, OF MERCERSBURG, PENNSYLVANIA.

COMBINED CULTIVATOR AND PLOW.

SPECIFICATION forming part of Letters Patent No. 324,219, dated August 11, 1885.

Application filed May 12, 1885. (No model.)

*To all whom it may concern:*

Be it known that I, DAVID W. BRICKER, a citizen of the United States, residing at Mercersburg, in the county of Franklin and State of Pennsylvania, have invented certain new and useful Improvements in Wheel-Plows, of which the following is a specification, reference being had therein to the accompanying drawing.

My invention relates to improvements in wheel-plows, and is designed to produce a device in which the plow is easily and quickly adjusted, in which the supporting-wheels may be adjusted to travel in the furrow and on the landside of the plow and have the bearings of their axles the same in all positions, and having the said bearings so constructed as to prevent side movement, to provide an improved bearing or support for a grass-roller, and to provide certain other points of construction and combination of parts, as set forth in the claims.

In describing the device reference is had to the annexed drawing, which represents a perspective view of the device.

The wheels A have spindles with upward extensions B, secured at their upper ends to rings C. An arch, D, has on its extremities elliptical-shaped plates E with central openings. The elliptical plates and the rings rest one against the other and form broad bearings, preventing the wheels from springing out of line. A bolt passing through the extensions B and the downward extensions of the arch hold the plates in conjunction. By means of a series of holes in the arch the bearings may be adjusted either at the top or bottom of the elliptical plates and the height of the said arch varied accordingly, without reducing the area of the said bearings.

On the arch is secured a frame having braces F, supporting its forward end. On each side of this frame are toothed or ratchet plates G, in each of which engage a lever-arm, H, firmly secured to the extensions B. By this means the wheels are thrown forward or backward independently, the securing-bolt acting as a pivot to adjust the plow to the different circumstances under which it may be operated.

Secured to the arch are perforated plates I, with the holes therein corresponding to holes in the downward extensions of said arch.

By means of bolts the bail K is pivoted to the arch and extending to the rear. On the bail are plates L, pivotally supporting, by means of bolts or other similar clamping devices, the plow-beam M, carrying a bar-share or gang plow.

Between the plates L are clamps N, secured to the bail, preventing movement of the said plates on the bail, and hence keeping the plow from swerving to one side or the other.

A roller, O, rests on the plow-beam, and is supported by a hanger adjustable in the frame.

A grass-roller, P, is supported in front of the plow by a hanger, R, pivoted to the arch by a bolt, and having an arm, S, extending therefrom to the bail, to which it is secured.

A curved arm, T, extends upward from the bail, and has a pivotal adjustable connection to a pitman, U. The pitman is connected to an L-lever, W, secured to the frame near the driver's seat. The lever and connections serve to raise the plow and the grass-roller with it when it is desired to jump obstructions or to transport the entire device from point to point.

The pole V, by means of holes in the frame, may be used at either side or in the center of the frame, as shown, for right or left hand plows, or gang-plows.

When the lever W is thrown sufficiently forward, it is there secured by a suitable catch, X, thereby keeping the plow well in the ground and to its work.

I claim—

1. The combination, with the arch having elliptical-shaped plates at the ends, of short axles or spindles with extensions provided with flat rings, the rings and plates being held adjustably in contact by bolts or similar securing devices, substantially as and for the purpose specified.

2. The combination, with the arch having elliptical-shaped plates at the ends, of short axles or spindles with extensions provided with flat rings, levers secured to the extensions on the spindles, ratchets or similar adjusting devices for the levers, and bolts or pivots holding the plates and rings adjustably in contact, substantially as and for the purpose specified.

3. In combination with an adjustable bail, a plow supported thereby and a grass-roller supported by a hanger pivoted in a frame, to which the bail is secured, said hanger having an integral arm projecting from the pivotal point on the same side thereof as is the hanger, and connecting to the bail, substantially as and for the purpose specified.

In testimony whereof I affix my signature in presence of two witnesses.

DAVID W. BRICKER.

Witnesses:
S. D. McKINNEY,
M. J. SLICK.